| United States Patent [19] | [11] | 4,411,924 |
|---|---|---|
| Sevenants | [45] | Oct. 25, 1983 |

[54] CREAM FLAVOR COMPOSITION FOR USE WITH BUTTERY FLAVORED FOOD PRODUCTS

[75] Inventor: Michael R. Sevenants, Forest Park, Ohio

[73] Assignee: The Procter & Gamble Co., Cincinnati, Ohio

[21] Appl. No.: 476,650

[22] Filed: Mar. 18, 1983

Related U.S. Application Data

[63] Continuation of Ser. No. 299,701, Sep. 8, 1981, abandoned.

[51] Int. Cl.³ .............................................. A23L 1/226
[52] U.S. Cl. .................................................... 426/534
[58] Field of Search ........................................ 426/534

*Primary Examiner*—Joseph M. Golian
*Attorney, Agent, or Firm*—Nancy S. Mayer; Eric W. Guttag; Richard C. Witte

[57] ABSTRACT

A cream flavor composition useful with buttery flavored food products such as shortenings and margarines. The composition consists of: (a) a carboxylic acid component selected from 8-nonenoic acid, 9-decenoic acid, 10-undecenoic acid, and mixtures thereof; and (b) a higher methyl ketone component selected from 2-undecanone, 2-dodecanone, 2-tridecanone, 2-tetradecanone, 2-pentadecanone, 2-hexadecanone, and mixtures thereof. A particularly preferred cream flavor composition consists of 9-decenoic acid and a mixture of 2-undecanone, 2-tridecanone and 2-pentadecanone. When added to the buttery flavored food product, the amount of the carboxylic acid component is from about 0.0025 to about 350 ppm; the amount of 2-undecanone and/or 2-dodecanone is from about 0.0014 to about 600 ppm; the amount of 2-tridecanone and/or 2-tetradecanone is from about 0.0085 to about 800 ppm; the amount of 2-pentadecanone and/or 2-hexadecanone is from about 0.0080 ppm to about 1000 ppm.

33 Claims, No Drawings

CREAM FLAVOR COMPOSITION FOR USE WITH BUTTERY FLAVORED FOOD PRODUCTS

This is a continuation, of application Ser. No. 299,701 filed Sept. 8, 1981 and now abandoned.

TECHNICAL FIELD

The present application relates to flavor compositions. In particular, the present application relates to cream flavor compositions useful in improving the flavor impression of buttery flavored food products such as shortenings and margarines.

BACKGROUND ART

Butter has a particularly distinctive flavor and aroma. This flavor and aroma character is desirable for a number of food products. Such food products include oleaginous foods such as shortenings and emulsified spreads such as margarine. Also, a buttery flavor character is desirable in fried foods and baked goods such as cakes and cookies.

In standard butter manufacture, cream is separated from milk by centrifugation. After neutralization and pasteurization, the cream is ripened by inoculation with a bacterial culture known as a "starter". The amount of starter mixed with the cream is usually about 5%, although in some cases somewhat more can be used. Ripening is usually carried out at a temperature of from 50° to 55° F. overnight; this time period can be reduced to a few hours when the temperature during ripening is from 65° to 70° F. It is mainly during this ripening step that the distinctive flavors and aroma of butter are generated. See *Bailey's Industrial Oil and Fat Products* (3rd Ed.), pp. 326–327.

The compounds contributing to the flavor and aroma of butter have long been a matter for discussion and conjecture. Some of the flavor character has been attributed to the lower carboxylic acids such as acetic, propionic and butyric acids. Another compound which contributes to the flavor and odor of butter is diacetyl, a yellow liquid having an extremely potent butter aroma. Other compounds isolated and identified as contributing to butter flavor and aroma include the lactones such as delta-decalactone (from butter oil) and delta-dodecalactone (from milk fat). See *Bailey's Industrial Oil and Fat Products*, supra, at pp. 322–323.

It has been found that a particular component of butter provides what is characterized as a creamy flavor impression. From gas chromatography of a typical butter, it has been determined that at least the following compounds (in free form) contribute to this creamy flavor impression:

| Compound | Amount (ppm) |
| --- | --- |
| 9-decenoic acid | 2 |
| 2-undecanone | 1 |
| 2-tridecanone | 6 |
| 2-pentadecanone | 6 |

Artificial or synthetic butter flavors used in various buttery flavored food products are frequently deficient in certain flavor characteristics. In particular, such butter flavors are missing the cream flavor impression of the above-noted compounds.

It is therefore an object of the present invention to improve the flavor impression of buttery flavored food products.

It is another object of the present invention to impart a creamy flavor impression to buttery flavored food products.

These and other objects of the present invention are hereinafter disclosed.

DISCLOSURE OF THE INVENTION

The present application relates to a novel flavor composition for imparting a creamy flavor impression to a variety of buttery flavored food products. This cream flavor composition consists essentially of:

(a) a carboxylic acid component selected from the group consisting of 8-nonenoic acid, 9-decenoic acid, 10-undecenoic acid, and mixtures thereof; and (b) a higher methyl ketone component selected from the group consisting of 2-undecanone, 2-dodecanone, 2-tridecanone, 2-tetradecanone, 2-pentadecanone, 2-hexadecanone, and mixtures thereof.

The present application particularly relates to buttery flavored food products to which this cream flavor composition is added. The cream flavor composition which is added consists essentially of:

(a) a carboxylic acid component in an amount of from about 0.0025 to about 350 ppm and selected from the group consisting of 8-nonenoic acid, 9-decenoic acid, 10-undecenoic acid, and mixtures thereof; and (b) a higher methyl ketone component selected from the group consisting of 2-undecanone and/or 2-dodecanone in amounts of from about 0.0014 to about 600 ppm, 2-tridecanone and/or 2-tetradecanone in amounts of from about 0.0085 to about 800 ppm, 2-pentadecanone and/or 2-hexadecanone in amounts of at least about 0.0080 ppm, and mixtures thereof.

2-undecanone, 2-tridecanone and 2-pentadecanone are taught as being present in fresh butter and especially in heated butter flavor. See Kinsella "Butter Flavor", *Food Technology* (May, 1975), pp. 82–89. Also, 9-decenoic acid is taught as being present in butterfat and milkfat fractions probably in the form of glyceride esters. See Hilditch et al, "The Occurrence and Possible Significance of Some of the Minor Component Acids of Cow Milk Fat", *Biochem J.*, Vol. 30 (1936), pp. 1905–1914 (0.2% by weight 9-decenoic acid present in butterfat); Patton et al, "The Role of Lactones in Flavor Deterioration of Milk Fat", *Science*, Vol. 19 (1954), pp. 218–219 (9-decenoic acid precursor of decalactone in milkfat); Noda et al, "Separation and Identification of Fatty Acids", *Nippon Nogei-Kagaku Kaishi*, Vol. 30 (1956), pp. 106–111 (cow milkfat containing 0.1% by weight 9-decenoic acid). See also Ryhage, "Identification of Fatty Acids from Butterfat Using a Combined Gas Chromatograph Mass Spectrometer", *J. Dairy Research*, Vol. 34 (1967), pp. 115–121 (0.1% by weight methyl decenoate isolated from commercial butterfat).

Mixtures of unsaturated ketones or unsaturated carboxylic acids with lower methyl ketones are also known in the art. For example, Australian butter oil is disclosed as having methyl ketones of from 3 to 9 carbon atoms, as well as a decenoic acid. See Forss et al, "Volatile Compounds in Butter Oil", *J. Dairy Research*, Vol. 34, 2d issue (1967), pp. 131–136. Also, a mixture of one part 8-none-2-one with a number of flavor ingredients including 2-pentanone and 2-heptanone is disclosed as having a butterlike flavor. See U.S. Pat. No. 3,904,780 to Yamamoto et al, issued Sept. 9, 1975 (Example 2).

See also U.S. Pat. No. 3,865,952 to Ney et al, issued Feb. 11, 1975 (blue cheese flavor composition containing 1-octen-3-ol in combination with methyl ketones having from 5 to 15 carbon atoms and fatty acids having from 2 to 12 carbon atoms. However, it has been surprisingly found that the combination of the specified unsaturated carboxylic acids with the specified higher methyl ketones of the present application imparts a creamy flavor impression to buttery flavored food products such as shortenings and margarines.

Definitions

The term "oleaginous food product" refers to a food product containing a fat and/or oil other than a fried food or baked good. Representative examples of oleaginous food products include emulsified spreads and shortenings.

The term "emulsified spread" refers to a water-in-oil or oil-in-water emulsion product. Such spreads include butter, margarine and low-fat spreads.

The term "margarine" refers to an emulsified spread characterized by an oil phase of at least about 80% by weight. Thus, margarines have an aqueous phase of up to about 20% by weight.

The term "fat" refers to a triglyceride composition characterized by a solid or plastic consistency at ambient temperatures, e.g. at about 70° F.

The term "oil" refers to triglyceride composition characterized by a fluid or liquid consistency at ambient temperatures, e.g. at about 70° F.

The term "shortening" refers to a non-emulsified fat and/or oil product which can be used in preparing fried foods and baked goods.

The term "baked good" refers to a food product normally prepared from a mix containing shortening, sugar and flour. Representative examples of baked goods include cakes and cookies.

The term "half-and-half" is defined as in the Standard of identity in 21 C.F.R. 131.180.

CREAM FLAVOR COMPOSITION

A. Components of Composition

The cream flavor composition of the present application includes a carboxylic acid component. This carboxylic acid component is selected from 8-nonenoic acid, 9-decenoic acid, 10-undecanoic acid, and mixtures thereof. 9-decenoic acid is particularly preferred as the carboxylic acid component.

The cream flavor composition further includes a higher methyl ketone component. This higher methyl ketone component is selected from 2-undecanone, 2-dodecanone, 2-tridecanone, 2-tetradecanone, 2-pentadecanone, 2-hexadecanone, and mixtures thereof. The preferred higher methyl ketones are 2-undecanone, 2-tridecanone and 2-pentadecanone. A mixture of 2-undecanone, 2-tridecanone and 2-pentadecanone is a particularly preferred higher methyl ketone component.

The cream flavor composition consists of the carboxylic acid component and the higher methyl ketone component. A substantially pure mixture of the carboxylic acid component and the higher methyl ketone component provides a particularly desirable creamy flavor impression. As used herein, the term "substantially pure mixture" refers to a mixture of the carboxylic acid component and the higher methyl ketone component with only trace impurities of other compounds.

B. Cream Flavor Character of Composition

Numerous words can be used to describe a "cream" or "creamy" flavor impression. An indication of what is "creamy" can be derived from the comments of those comparing the flavor characteristics of milk to half-and-half, as previously defined on page 5. Half-and-half has been described as: (1) "richer"; (2) a "cream flavor/whipping cream flavor/more dairy flavor"; (3) having "more body/thicker mouthfeel"; (4) "sweeter". By comparison, a buttery flavored oil containing the cream flavor composition (9-decenoic acid, 2-undecanone, 2-tridecanone and 2-pentadecanone) of the present application (paneled against a buttery flavored oil without this composition) has been described as: (1) "milder"; (2) "richer/fuller"; (3) having "more body"; (4) "sweeter"; (5) having a "sweet dairy note"; (6) "smoother/more well-rounded".

USES OF CREAM FLAVOR COMPOSITION

A. Buttery Flavored Food Products

The cream flavor composition of the present application can be added to a variety of buttery flavored food products. The composition is particularly useful in imparting creamy flavor impressions to oleaginous food products. Such food products include buttery flavored shortenings and emulsified spreads such as margarine. The composition can also be used to improve the creamy flavor impression of butter. Other buttery flavored food products for which the cream flavor composition is useful include fried foods and baked goods such as cakes and cookies. For baked good mixes, the cream flavor composition is normally included as part of the shortening ingredients.

The amounts (ppm by weight of the buttery flavored food product) of the two components of the cream flavor composition can vary depending upon the type of buttery flavored food product. The amount of the carboxylic acid component can range from about 0.0025 ppm to about 350 ppm. The amounts of the higher methyl ketones vary depending upon the particular methyl ketone. For 2-undecanone (or 2-dodecanone), the amount ranges from about 0.0014 to about 600 ppm; for 2-tridecanone (or 2-tetradecanone), from about 0.0085 to about 800 ppm; for 2-pentadecanone (or 2-hexadecanone), at least about 0.0080 ppm.

The variance in amounts of the two components for buttery flavored food products is illustrated by emulsified spreads and buttery flavored shortenings. Generally, emulsified spreads need lesser amounts of the two components for a detectable creamy flavor impression while buttery flavored shortening products can have a desirable creamy flavor impression with larger amounts of the two components. For emulsified spreads, the amount of the carboxylic acid component is typically from about 0.0025 to about 50 ppm, while the amounts of 2-undecanone (or 2-dodecanone), 2-tridecanone (or 2-tetradecanone), and 2-pentadecanone (or 2-hexadecanone) are typically from about 0.0014 to about 400 ppm, from about 0.0085 to about 500 ppm, and from about 0.0080 to about 1000 ppm, respectively. For shortenings, the amount of the carboxylic acid component is typically from about 0.5 to about 50 ppm, while the amounts of 2-undecanone (or 2-dodecanone), 2-tridecanone (or 2-tetradecanone), and 2-pentadecanone (or 2-hexadecanone) are typically from about 0.25 to about 400 ppm, from about 1.5 to about 500 ppm, and from about 1.5 to about 1000 ppm, respectively.

B. Buttery Flavor Component

The cream flavor composition of the present application is usually incorporated as part of the buttery flavor component of the food product. The buttery flavor component can be derived from natural dairy sources such as nonfat milk solids, cooked milk, whey solids, buttermilk, butter oil, and butter cultures. A variety of saturated fatty acids, including butyric, capric, caprylic, and caproic acids, can be included in the buttery flavor component. A particularly desirable buttery compound is diacetyl derived either synthetically or more typically from a bacterial culture. Also, the methyl ketones such as 2-pentanone and 2-heptanone can be included in the buttery flavor component. Other compounds which have been used in buttery flavor compositions include the lactones, such as delta-decalactone and delta-dodecalactone, the aldehydes such as cis-heptanal, and the indoles such as skatole.

Panel Testing Illustrating Scope of Cream Flavor Compositions of Present Application and Uses Thereof The following panel testing illustrates the scope of the cream flavor compositions of the present application and the uses thereof:

A. Paneling in Buttery Flavored Shortening Products

1. Upper Limits

Various buttery flavored oil formulations were prepared by dispersing the cream flavor compositions, together with a butter flavor composition, in partially hydrogenated and winterized soybean oil having an iodine value of 110–115. The level of the butter flavor composition was kept constant in the various oil formulations at 203 ppm. The butter flavor composition consisted of a Butter Flavor A (mixture of butter flavor compounds, including butyric acid, caprylic acid, caproic acid, lauric acid, butyl butyryl lactate, delta-decalactone, and delta-dodecalactone) at 136 ppm and a Butter Flavor B (mixture of butter flavor compounds, including diacetyl, butyl butyryl lactate, delta-decalactone, and valeric acid) at 67 ppm. During paneling of the oil formulations, panelists were asked to evaluate acceptability thereof as part of a flavor system. The panelists were skilled in organoleptic evaluations of butter and buttery flavored food products.

The cream flavor compositions paneled and the results from the paneling are presented in the following Table:

|  | Cream Flavor Composition | | | | |
| --- | --- | --- | --- | --- | --- |
|  | I | II | III | IV | V |
| Compounds (ppm)* | | | | | |
| 9-decenoic acid | 350 | 25 | 50 | 50 | 350 |
| 2-undecanone | 1 | 600 | — | — | 600 |
| 2-tridecanone | 6 | — | 800 | — | 800 |
| 2-pentadecanone | 6 | — | — | 1000 | 1000 |
| Panel | | | | | |
| Total No. | 10 | 8 | 10 | 9 | 9 |
| Acceptable | 7 | 6 | 7 | 7 | 3 |
| Unacceptable | 3 | 2 | 3 | 2 | 6 |

*Compounds obtained from Bedoukian Research, Inc., Danbury, Conn.

As shown by the above Table (cream flavor composition I-IV), 9-decenoic acid, 2-undecanone, 2-tridecanone and 2-pentadecanone can be acceptable in cream flavor compositions at levels as high as 350 ppm, 600 ppm, 800 ppm and 1000 ppm, respectively. As also shown by the above Table (cream flavor composition V), the levels of these components should be adjusted accordingly when the cream flavor composition contains a mixture of 9-decenoic acid, 2-undecanone, 2-tridecanone and 2-pentadecanone.

2. Preferred Higher Levels

Various buttery flavored oil formulations were prepared as in the preceding Upper Limits paneling. Butter Flavors A and B were used with the levels being the same. During paneling, panelists were asked whether the flavor of each oil formulation would taste good in a margarine. The cream flavor compositions paneled and the results from the paneling are presented in the following Table:

|  | Cream Flavor Composition | | | |
| --- | --- | --- | --- | --- |
|  | VI | VII | VIII | IX |
| Compounds (ppm) | | | | |
| 9-decenoic acid | 50 | 25 | 25 | 25 |
| 2-undecanone | 1 | 400 | — | — |
| 2-tridecanone | 6 | — | 500 | — |
| 2-pentadecanone | 6 | — | — | 1000 |
| Panel | | | | |
| Total No. | 9 | 9 | 10 | 9 |
| Good | 9 | 5 | 8 | 9 |
| No Good | 0 | 4 | 2 | 0 |

As shown by the above Table, 9-decenoic acid, 2-undecanone, 2-tridecanone, and 2-pentadecanone were preferred in cream flavor compositions for buttery flavored oils at levels as high as 50 ppm, 400 ppm, 500 ppm and 1000 ppm, respectively.

3. Detectable Lower Levels

Buttery flavored oil formulations were prepared as in preceding Upper Limits paneling. Butter Flavors A and B were used but at half the amount (68 and 33.5 ppm, respectively). Two oil formulations were paneled in a pair comparison test wherein one of the formulations contained the cream flavor composition. Panelists were asked to determine which of the oil formulations was more creamy. The cream flavor compositions paneled and the results from the paneling are presented in the following Table:

|  | Cream Flavor Composition | |
| --- | --- | --- |
|  | X | XI |
| Compounds (ppm) | | |
| 9-decenoic acid | 0.5 | 0.25 |
| 2-undecanone | 0.25 | 0.13 |
| 2-tridecanone | 1.5 | 0.75 |
| 2-pentadecanone | 1.5 | 0.75 |
| Panel | | |
| Total No. | 9 | 10 |
| Correct | 8* | 6** |
| Incorrect | 1 | 4 |

*Significant difference
**Nonsignificant difference

As shown by the above Table a mixture of, 9-decenoic acid, 2-undecanone, 2-tridecanone and 2-pentadecanone was detectable in buttery flavored oils at the level represented by composition X, but not at the level represented by composition XI.

B. Paneling in Margarines

1. Lower Limits

Cream flavor compositions according to the present application were paneled in margarines. The margarines were obtained by mixing standard aqueous phase ingredients of milk solids, salt, water and preservatives with an oil phase consisting of hydrogenated soybean oil, mono- and di-glyceride and lecithin emulsifiers, and beta-carotene.

A butter flavor composition, with or without the cream flavor composition, was added as part of the oil phase. This butter flavor composition consisted of the following:

| Compound | Amount (ppm) |
| --- | --- |
| Dairy Flavor A* | 682 |
| Dairy Flavor B** | 91 |
| Corn Syrup | 1350 |
| Butter Flavor A | 136 |
| Butter Flavor B | 67 |

*mixture of dairy flavor compounds including carboxylic acids, lactones, ketones and diketones
**mixture of dairy flavor compounds including carboxylic acids, lactones, ketones and diketones The cream flavor composition (XII), when added, consisted of the following:

| Compound | Amount (ppm) |
| --- | --- |
| 9-decenoic acid | 0.00265 |
| 2-undecanone | 0.00145 |
| 2-tridecanone | 0.0086 |
| 2-pentadecanone | 0.0081 |

The aqueous and oil phase ingredients were mixed. When the emulsion set up, it was then poured into tubs which were refrigerated for storage.

For paneling, the margarine products were heated until completely melted. Margarines containing the cream flavor composition were triangle tested against margarines which did not contain the cream flavor composition. Two panelists sensitive to the cream flavor composition were asked to identify which was the odd sample. One panelist was able to identify the odd sample 7 out of 7 times; the other panelist 1 out of 3 times. Such paneling indicates that the flavor impression of a mixture of 9-decenoic acid, 2-undecanone, 2-tridecanone, and 2-pentadecanone, is detectable at the level represented by composition XII in margarine.

2. Higher Levels

Panelists were given a commercial margarine (Royal Scot margarine) and were told it was defined as desirable. Panelists were then asked to judge the desirability of margarines containing the cream flavor composition prepared as in the Lower Limits paneling. The cream flavor compositions paneled and the results of the paneling are presented in the following Table:

| | Cream Flavor Composition | |
| --- | --- | --- |
| | XIII | XIV |
| Compounds (ppm) | | |
| 9-decenoic acid | 50 | 38 |
| 2-undecanone | 400 | 300 |
| 2-tridecanone | 500 | 373 |
| 2-pentadecanone | 1000 | 750 |
| Panel | | |
| Total No. | 10 | 10 |
| Desirable | 6 | 9 |
| Undesirable | 4 | 1 |

As shown by the above Table, a mixture of 9-decenoic acid, 2-undecanone, 2-tridecanone and 2-pentadecanone is acceptable in cream flavor compositions for margarines at the high levels of compositions XIII and XIV.

C. Evaluation of Cream Flavor Impression

The cream flavor impression of the compositions accordiang to the present application was evaluated. Two buttery flavored oil formulations similar to those used in the Shortening paneling were made containing Butter Flavor A (68 ppm) and Butter Flavor B (33.5 ppm). One of the oil formulations also contained a cream flavor composition (XV) which consisted of the following:

| Compound | Amount (ppm) |
| --- | --- |
| 9-decenoic acid | 2 |
| 2-undecanone | 1 |
| 2-tridecanone | 6 |
| 2-pentadecanone | 6 |

These two oil formulations were then paneled. The panelists were trained to detect "creamy" by paneling milk against half-and-half, as defined previously on page 5, in particular Meyer's 2% Vitamin A & D lowfat milk versus Meyer's Ultra-Pasteurized Half & Half. Of the 7 panelists used in the panel, all 7 identified the oil formulation containing the cream flavor composition as having the creamy flavor.

What is claimed is:

1. A cream flavor composition, which consists of:
    (a) a carboxylic acid component in an amount of from about 0.0025 to about 350 ppm selected from the group consisting of 8-nonenoic acid, 9-decenoic acid, 10-undecenoic acid, and mixtures thereof; and
    (b) a higher methyl ketone component selected from the group consisting of 2-undecanone in an amount of from about 0.0014 to about 600 ppm, 2-dodecanone in an amount of from about 0.0014 to about 600 ppm, 2-tridecanone in an amount of from about 0.0085 to about 800 ppm, 2-tetradecanone in an amount of from about 0.0085 to about 800 ppm, 2-pentadecanone in an amount of from about 0.0800 to about 1000 ppm, 2hexadecanone in an amount of from about 0.0080 to about 1000 ppm, and mixtures thereof.

2. A composition according to claim 1, wherein said carboxylic acid component is 9-decenoic acid.

3. A composition according to claim 2, wherein said higher methyl ketone component is selected from the group consisting of 2-undecanone, 2-tridecanone, 2-pentadecanone, and mixtures thereof.

4. A composition according to claim 3, wherein said higher methyl ketone component is a mixture of 2-undecanone, 2-tridecanone, and 2-pentadecanone.

5. A composition according to claim 3 which is a substantially pure mixture of said 9-decenoic acid and said higher methyl ketone component.

6. A buttery flavored food product which has added thereto a cream flavor composition, which consists of:
(a) a carboxylic acid component in an amount of from about 0.0025 to about 350 ppm and selected from the group consisting of 8-nonenoic acid, 9-decenoic acid, 10-undecenoic acid, and mixtures thereof; and
(b) a higher methyl ketone component selected from the group consisting of 2-undecanone in an amount of from about 0.0014 to about 600 ppm, 2-dodecanone in an amount of from about 0.0014 to about 600 ppm, 2-tridecanone in an amount of from about 0.0085 to about 800 ppm, 2-tetradecanone in an amount of from about 0.0085 to about 800 ppm, 2-pentadecanone in an amount of from about 0.0080 ppm to about 1000 ppm, 2-hexadecanone in an amount of from about 0.0080 ppm to about 1000 ppm, and mixtures thereof.

7. A food product according to claim 6, wherein said carboxylic acid component is 9-decenoic acid.

8. A food product according to claim 7, wherein said higher methyl ketone component is selected from the group consisting of 2-undecanone, 2-tridecanone, 2-pentadecanone, and mixtures thereof.

9. A food product according to claim 8, wherein said higher methyl ketone component is a mixture of 2-undecanone, 2-tridecanone and 2-pentadecanone.

10. A food product according to claim 8 which is a buttery flavored oleaginous food product.

11. A food product according to claim 10 which is a buttery flavored shortening.

12. A food product according to claim 11 wherein the amount of 9-decenoic acid is from about 0.5 to about 50 ppm.

13. A food product according to claim 12 wherein the amount of 2-undecanone is from about 0.25 to about 400 ppm, the amount of 2-tridecanone is from about 1.5 to about 500 ppm and the amount of 2-pentadecanone is from about 1.5 to about 1000 ppm.

14. A food product according to claim 13 wherein said higher methyl ketone component is a mixture of 2-undecanone, 2-tridecanone and 2-pentadecanone.

15. A food product according to claim 10 which is an emulsified spread.

16. A food product according to claim 15 wherein the emulsified spread is a margarine.

17. A food product according to claim 16 wherein the amount of 9-decenoic acid is from about 0.0025 to about 50 ppm.

18. A food product according to claim 17 wherein the amount of 2-undecanone is from about 0.0014 to about 400 ppm, the amount of 2-tridecanone is from about 0.0085 to about 500 ppm, and the amount of 2-pentadecanone is from about 0.0080 to about 1000 ppm.

19. A food product according to claim 18 wherein said higher methyl ketone component is a mixture of 2-undecanone, 2-tridecanone and 2-pentadecanone.

20. A method for improving the flavor of a buttery flavored food product, which comprises the step of:
(a) adding to a buttery flavored food product, a cream flavor composition which consists of:
(i) a carboxylic acid component in an amount of from about 0.0025 to about 350 ppm and selected from the group consisting of 8-nonenoic acid, 9-decenoic acid, 10-undecenoic acid, and mixtures thereof; and
(ii) a higher methyl ketone component selected from the group consisting of 2-undecanone in an amount of from about 0.0014 to about 600 ppm, 2-dodecanone in an amount of from about 0.0014 to about 600 ppm, 2-tridecanone in an amount of from about 0.0085 to about 800 ppm, 2-tetradecanone in an amount of from about 0.0085 to about 800 ppm, 2-pentadecanone in an amount of from about 0.0080 ppm to about 1000 ppm, 2-hexadecanone in an amount of from about 0.0080 ppm to about 1000 ppm, and mixtures thereof.

21. A method according to claim 20 wherein the buttery flavored product is a buttery flavored oleaginous food product.

22. A method according to claim 21 wherein the carboxylic acid component is 9-decenoic acid.

23. A method according to claim 22 wherein the higher methyl ketone component is selected from the group consisting of 2-undecanone, 2-tridecanone, 2-pentadecanone, and mixtures thereof.

24. A method according to claim 23 wherein the higher methyl ketone component is a mixture of 2-undecanone, 2-tridecanone and 2-pentadecanone.

25. A method according to claim 23 wherein the oleaginous food product is a buttery flavored shortening.

26. A method according to claim 25 wherein the amount of 9-decenoic acid is from about 0.5 to about 50 ppm.

27. A method according to claim 26 wherein the amount of 2-undecanone is from about 0.25 to about 400 ppm, the amount of 2-tridecanone is from about 1.5 to about 500 ppm and the amount of 2-pentadecanone is from about 1.5 to about 1000 ppm.

28. A method according to claim 27 wherein the higher methyl ketone component is a mixture of 2-undecanone, 2-tridecanone and 2-pentadecanone.

29. A method according to claim 23 wherein the buttery flavored product is an emulsified spread.

30. A method according to claim 29 wherein the emulsified spread is a margarine.

31. A method according to claim 29 wherein the amount of 9-decenoic acid is from about 0.0025 to about 50 ppm.

32. A method according to claim 30 wherein the amount of 2-undecanone is from about 0.0014 to about 400 ppm, the amount of 2-tridecanone is from about 0.0085 to about 500 ppm, and the amount of 2-pentadecanone is from about 0.0080 to about 1000 ppm.

33. A method according to claim 32 wherein the higher methyl ketone component is a mixture of 2-undecanone, 2-tridecanone and 2-pentadecanone.

* * * * *

UNITED STATES PATENT AND TRADEMARK OFFICE
CERTIFICATE OF CORRECTION

PATENT NO. : 4,411,924                         Page 1 of 3

DATED : October 25, 1983

INVENTOR(S) : Michael R. Sevenants

It is certified that error appears in the above-identified patent and that said Letters Patent are hereby corrected as shown below:

On the title page, the following should be added:

US PATENT DOCUMENTS 3,865,952 2/1975 Ney et al.
3,904,780 9/1975 Yamamoto et al.
3,127,275 3/1964 Patton
3,767,427 10/1973 Chang et al.
3,635,737 1/1972 Baron

OTHER PUBLICATIONS

Bailey's Industrial Oil and Fat Products, D.Swern, Ed.,
    (3rd Ed. 1964), pp. 322-323, 326-327,
    Interscience Publishers, N.Y.

Kinsella, "Butter Flavor", Food Technology
    (May 1975), pp. 82-98.

Hilditch et al., "The Occurrence and Possible Significance
    of Some of the Minor Component Acids of Cow Milk Fat",
    Biochem. J., Vol. 30 (1936), pp. 1905-1914.

Patton et al., "The Role of lactones in Flavor Deterioration
    of Milk Fat", Science, Vol. 119 (1954), pp. 218-219.

UNITED STATES PATENT AND TRADEMARK OFFICE
CERTIFICATE OF CORRECTION

PATENT NO. : 4,411,924

DATED : October 25, 1983

INVENTOR(S) : Michael R. Sevenants

It is certified that error appears in the above-identified patent and that said Letters Patent are hereby corrected as shown below:

Noda et al., "Separation and Identification of Fatty Acids",
  Nippon Nogei-Kagaku Kaishi, Vol.30 (1956), pp. 106-111.

Ryhage, "Identification of Fatty Acids from Butterfat Using
  a Combined Gas Chromatograph-Mass Spectrometer",
  J. Dairy Research, Vol. 34 (1967), pp. 115-121.

Forss et al., "Volatile Compounds in Butter Oil",
  J. Dairy Research, Vol. 34, 2d issue, (1967), pp. 131-136.

Fenaroli's Handbook of Flavor Ingredients, Vol. II,
  p. 555 (2nd Ed. 1975).

Yoshizawa et al., "Attractancy of Some Methyl Ketones
  Isolated from Cheddar Cheese for Cheese Mites",
  Bochu-Kagaku, Vol. 35, 2d issue, pp. 43-45 (1970).

Boldingh & Taylor, "Trace Constituents of Butterfat",
  Nature, Vol. 194, No. 4832, pp. 909-913 (June 9, 1962)

UNITED STATES PATENT AND TRADEMARK OFFICE
CERTIFICATE OF CORRECTION

PATENT NO. : 4,411,924

DATED : October 25, 1983

INVENTOR(S) : Michael R. Sevenants

It is certified that error appears in the above-identified patent and that said Letters Patent are hereby corrected as shown below:

Patton & Tharp, "Formation of Methyl Ketones from Milk Fat During Steam Distillation or Saponification", J. Dairy Science, Vol. 42, No. 1, pp. 49-55 (1959).

Winter et al., "Volatile Carbonyl Constituents of Dairy Butter, J. Food Science, Vol. 28, No. 5, pp. 554-561 (1963).

Nawar & Fagerson, "Direct Gas Chromatographic Analysis as an Objective Method of Flavor Measurement", Food Technology, pp. 107-109 (November 1962).

Signed and Sealed this

Thirteenth Day of November 1984

[SEAL]

Attest:

*Attesting Officer*

GERALD J. MOSSINGHOFF

*Commissioner of Patents and Trademarks*